United States Patent
Toyama

(10) Patent No.: US 12,315,290 B2
(45) Date of Patent: May 27, 2025

(54) INFORMATION PROCESSING SYSTEM, INFORMATION PROCESSING METHOD, BIOMETRIC MATCHING SYSTEM, BIOMETRIC MATCHING METHOD, AND STORAGE MEDIUM

(71) Applicant: NEC Corporation, Tokyo (JP)

(72) Inventor: Hiroaki Toyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/574,826

(22) PCT Filed: Jul. 5, 2021

(86) PCT No.: PCT/JP2021/025286
§ 371 (c)(1),
(2) Date: Dec. 28, 2023

(87) PCT Pub. No.: WO2023/281571
PCT Pub. Date: Jan. 12, 2023

(65) Prior Publication Data
US 2024/0304028 A1    Sep. 12, 2024

(51) Int. Cl.
*G06K 9/00* (2022.01)
*G06V 40/12* (2022.01)

(52) U.S. Cl.
CPC ...... *G06V 40/1365* (2022.01); *G06V 40/1347* (2022.01)

(58) Field of Classification Search
CPC .......... G06V 40/1365; G06V 40/1347; G06V 40/70; G06V 40/174; G06F 21/44; G06N 20/00

USPC ......................................................... 382/118
See application file for complete search history.

(56) References Cited

U.S. PATENT DOCUMENTS

| | | | |
|---|---|---|---|
| 5,974,163 A | 10/1999 | Kamei | |
| 6,067,369 A | 5/2000 | Kamei | |
| 2006/0115157 A1* | 6/2006 | Mori | G06V 40/174 |
| | | | 382/118 |
| 2014/0185885 A1 | 7/2014 | Yamada et al. | |
| 2014/0205162 A1 | 7/2014 | Hara | |
| 2017/0243042 A1* | 8/2017 | Walch | G06V 40/70 |
| 2019/0266383 A1 | 8/2019 | Toyama et al. | |
| 2020/0082062 A1* | 3/2020 | Mequanint | G06F 21/44 |
| 2021/0390458 A1* | 12/2021 | Blumstein | G06N 20/00 |

(Continued)

FOREIGN PATENT DOCUMENTS

| | | |
|---|---|---|
| JP | H01-320587 A | 12/1989 |
| JP | H09-161054 A | 6/1997 |
| JP | H10-63858 A | 3/1998 |

(Continued)

OTHER PUBLICATIONS

International Search Report for PCT Application No. PCT/JP2021/025286, mailed on Sep. 28, 2021.

*Primary Examiner* — Abdul-Samad A Adediran

(57) ABSTRACT

There is provided an information processing system including an image information acquisition means for acquiring direction information and quality information indicating quality of the direction information from a biometric image, and an output means for outputting a feature amount of the biometric image by inputting a vector having a direction associated with the direction information and a length associated with the quality information.

6 Claims, 13 Drawing Sheets

(56) References Cited

U.S. PATENT DOCUMENTS

2022/0027686 A1     1/2022   Chiba et al.

FOREIGN PATENT DOCUMENTS

| JP | H10-177650 A | 6/1998 |
| JP | 2006-012080 A | 1/2006 |
| JP | 2013-065119 A | 4/2013 |
| JP | 2014-127164 A | 7/2014 |
| JP | 2019-159974 A | 9/2019 |
| JP | 2020-052886 A | 4/2020 |
| JP | 2020-155159 A | 9/2020 |
| WO | 2013/027572 A1 | 2/2013 |

* cited by examiner

INPUT LAYER | INTERMEDIATE LAYER | OUTPUT LAYER

FIG. 11

| BODY PARTS | FIRST FEATURE AMOUNT GROUP | SECOND FEATURE AMOUNT GROUP |
|---|---|---|
| RIGHT HAND THUMB | F1[1] | F2[1] |
| RIGHT HAND INDEX FINGER | F1[2] | F2[2] |
| RIGHT HAND MIDDLE FINGER | F1[3] | F2[3] |
| RIGHT HAND RING FINGER | F1[4] | F2[4] |
| ⋮ | ⋮ | ⋮ |
| LEFT HAND LITTLE FINGER | F1[10] | F2[10] |

INFORMATION PROCESSING SYSTEM, INFORMATION PROCESSING METHOD, BIOMETRIC MATCHING SYSTEM, BIOMETRIC MATCHING METHOD, AND STORAGE MEDIUM

This application is a National Stage Entry of PCT/JP2021/025286 filed on Jul. 5, 2021, the contents of all of which are incorporated herein by reference, in their entirety.

TECHNICAL FIELD

This disclosure relates to an information processing system, an information processing method, a biometric matching system, a biometric matching method, and a storage medium.

BACKGROUND ART

Various approaches for extracting features from data have been discussed. PTL 1 discloses a technique of extracting a direction of a ridge of a fingerprint image. PTL 2 discloses a technique of extracting features from input data using machine learning.

CITATION LIST

Patent Literature

[PTL 1] International Publication No. 2013/027572
[PTL 2] Japanese Patent Application Laid-Open No. 2020-052886

SUMMARY OF INVENTION

Technical Problem

Further improvements have been sought in elemental techniques related to biometric matching, such as the feature extraction described in PTL 1 and PTL 2.

It is an example object of this disclosure to provide an information processing system, an information processing method, a biometric matching system, a biometric matching method, and a storage medium capable of realizing a more preferable biometric matching.

Solution to Problem

According to an example aspect of this disclosure, there is provided an information processing system including an image information acquisition means for acquiring direction information and quality information indicating quality of the direction information from a biometric image, and an output means for outputting a feature amount of the biometric image by inputting a vector having a direction associated with the direction information and a length associated with the quality information.

According to another example aspect of this disclosure, there is provided an information processing method including acquiring direction information and quality information indicating quality of the direction information from a biometric image, and outputting a feature amount of the biometric image by inputting a vector having a direction associated with the direction information and a length associated with the quality information.

According to another example aspect of this disclosure, there is provided a storage medium storing an information processing program that causes a computer to execute an information processing method including acquiring direction information and quality information indicating quality of the direction information from a biometric image, and outputting a feature amount of the biometric image by inputting a vector having a direction associated with the direction information and a length associated with the quality information.

According to another example aspect of this disclosure, there is provided a biometric matching system including a first feature amount group acquisition means for acquiring a first feature amount group including a plurality of feature amounts respectively extracted from a plurality of body parts of a first target person, a second feature amount group acquisition means for acquiring a second feature amount group including a plurality of feature amounts respectively extracted from the plurality of body parts of a second target person, and a matching means for calculating a first score by comparing a feature amount included in the first feature amount group with a feature amount included in the second feature amount group for each of the plurality of body parts, and outputting a second score obtained by adding a plurality of the first scores respectively associated with the plurality of body parts. The matching means sets a predetermined value to a missing feature amount when at least one of the first feature amount group and the second feature amount group misses a part of the feature amounts.

According to another example aspect of this disclosure, there is provided a biometric matching method including acquiring a first feature amount group including a plurality of feature amounts respectively extracted from a plurality of body parts of a first target person, acquiring a second feature amount group including a plurality of feature amounts respectively extracted from the plurality of body parts of a second target person, and calculating a first score by comparing a feature amount included in the first feature amount group with a feature amount included in the second feature amount group for each of the plurality of body parts, and outputting a second score obtained by adding a plurality of the first scores respectively associated with the plurality of body parts. A predetermined value is set to a missing feature amount when at least one of the first feature amount group and the second feature amount group misses a part of the feature amounts.

According to another example aspect of this disclosure, there is provided a storage medium storing a biometric matching program for causing a computer to execute a biometric matching method including acquiring a first feature amount group including a plurality of feature amounts respectively extracted from a plurality of body parts of a first target person, acquiring a second feature amount group including a plurality of feature amounts respectively extracted from the plurality of body parts of a second target person, and calculating a first score by comparing a feature amount included in the first feature amount group with a feature amount included in the second feature amount group for each of the plurality of body parts, and outputting a second score obtained by adding a plurality of the first scores respectively associated with the plurality of body parts. A predetermined value is set to a missing feature amount when at least one of the first feature amount group and the second feature amount group misses a part of the feature amounts.

BRIEF DESCRIPTION OF DRAWINGS

FIG. 11 is a table illustrating a first feature amount group and a second feature amount group according to the third example embodiment.

DESCRIPTION OF EMBODIMENTS

Figure 1:
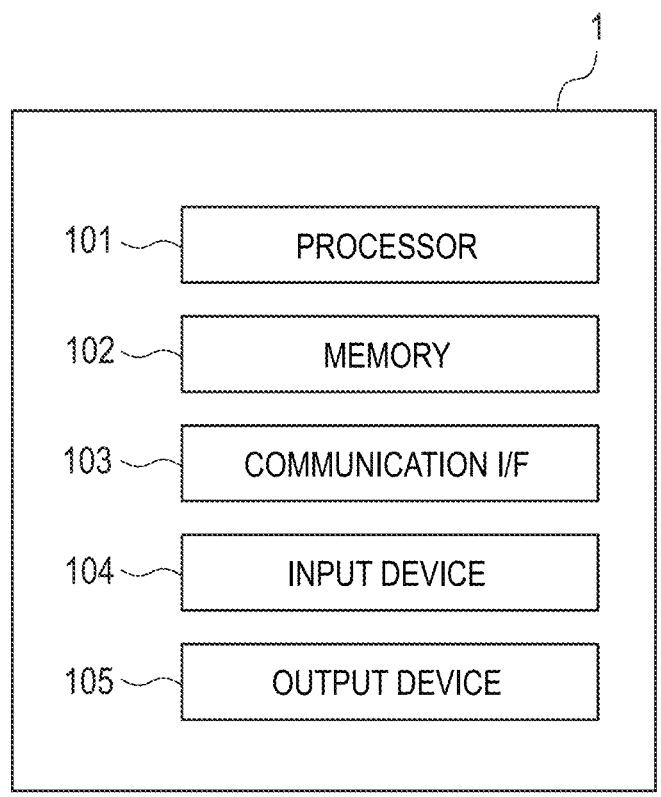
FIG. 1 is a block diagram illustrating a hardware configuration of an information processing apparatus according to a first example embodiment.

Example embodiments of this disclosure will now be described with reference to the drawings. In the drawings, similar elements or corresponding elements are denoted by the same reference numeral, and description thereof may be omitted or simplified.

First Example Embodiment

An information processing apparatus according to a first example embodiment extracts feature from a biometric image and outputs a feature amount. Here, the biometric image may be an image of a finger of a person, a palm of a person, an iris of a person, or the like. In addition, the biometric image may include a fingerprint of a finger, a palm print of a palm, a blood vessel inside a finger or a palm, a pattern of an iris, or the like. The biometric image may be acquired by capturing a finger of a person, a palm of a person, an iris, or the like by a camera, a scanner, or the like, or may be acquired by capturing a pattern, which is latently retained on an object, by a camera, a scanner, or the like. The feature amount extracted by the information processing apparatus can be used for biometric matching such as fingerprint matching, palm print matching, blood vessel matching, and iris matching. The feature extraction processing by the information processing apparatus can be used for both an extraction of a feature amount of a person to be registered at the time of registering a person and an extraction of a feature amount of a matching target person at the time of matching.

FIG. 1 is a block diagram illustrating a hardware configuration example of an information processing apparatus 1. The information processing apparatus 1 may be a computer such as a personal computer (PC), a processing server, a smartphone, or a microcomputer. The information processing apparatus 1 includes a processor 101, a memory 102, a communication interface (I/F) 103, an input device 104, and an output device 105. The units of the information processing apparatus 1 are connected to each other via a bus, wiring, a driving device, and the like (not illustrated).

The processor 101 is, for example, a processing device including one or a plurality of arithmetic processing circuits such as a CPU (Central Processing Unit), a GPU (Graphics Processing Unit), an FPGA (Field-Programmable Gate Array), an ASIC (Application Specific Integrated Circuit), and a TPU (Tensor Processing Unit). The processor 101 has a function of performing a predetermined operation in accordance with a program stored in the memory 102 or the like and controlling each unit of the information processing apparatus 1.

The memory 102 may include a volatile storage medium that provides a temporary memory area necessary for the operation of the processor 101, and a non-volatile storage medium that non-temporarily stores information such as data to be processed and an operation program of the information processing apparatus 1. Examples of volatile storage media include a RAM (Random Access Memory). Examples of the non-volatile storage medium include a ROM (Read Only Memory), an HDD (Hard Disk Drive), an SSD (Solid State Drive), and a flash memory.

The communication I/F 103 is a communication interface based on standards such as Ethernet (registered trademark), Wi-Fi (registered trademark), Bluetooth (registered trademark), and the like. The communication I/F 103 is a module for communicating with other apparatuses such as a data server and an imaging apparatus.

The input device 104 is a keyboard, a pointing device, a button, or the like, and is used by a user to operate the information processing apparatus 1. Examples of the pointing device include a mouse, a trackball, a touch panel, and a pen tablet. The input device 104 may include an imaging device such as a camera or a scanner. These imaging devices can be used to acquire biometric images.

The output device 105 is a device that presents information to a user such as a display device or a speaker. The input device 104 and the output device 105 may be integrally formed as a touch panel.

In FIG. 1, the information processing apparatus 1 is configured by one apparatus, but the configuration of the information processing apparatus 1 is not limited thereto. For example, the information processing apparatus 1 may be an information processing system including one or a plurality of apparatuses. Further, the information processing apparatus 1 may be added with other devices or may not be provided with some of the devices. Some devices may be replaced with other devices having similar functions. Further, some functions of the first example embodiment may be provided by another device via a network, or the functions of the first example embodiment may be distributed among a plurality of devices. For example, the memory 102 may include cloud storage, which is a storage device provided in another measure. Thus, the hardware configuration of the information processing apparatus 1 can be changed as appropriate.

Figure 2:
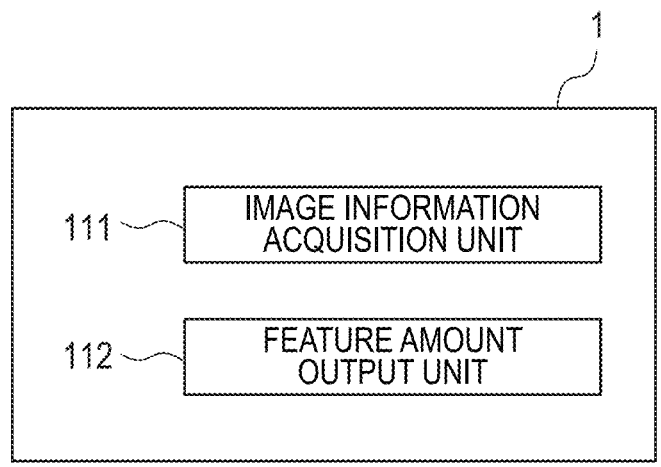
FIG. 2 is a functional block diagram of the information processing apparatus according to the first example embodiment.

FIG. 2 is a functional block diagram of the information processing apparatus 1 according to the first example embodiment. The information processing apparatus 1 includes an image information acquisition unit 111 and a feature amount output unit 112.

The processor 101 performs predetermined arithmetic processing by executing a program stored in the memory 102. The processor 101 controls the memory 102, the communication I/F 103, the input device 104, and the output device 105 based on the program. Thus, the processor 101 realizes functions of the image information acquisition unit 111 and the feature amount output unit 112. The image information acquisition unit 111 and the feature amount output unit 112 may be referred to as an image information acquisition means and an output means, respectively.

Figure 3:
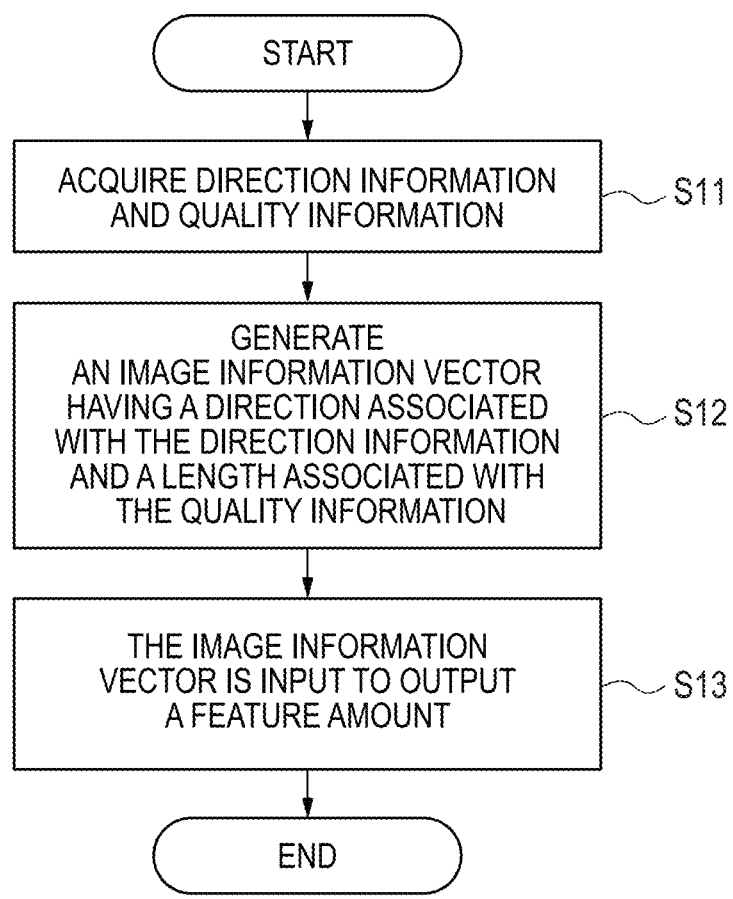
FIG. 3 is a flowchart illustrating an outline of feature amount output processing performed in the information processing apparatus according to the first example embodiment.

FIG. 3 is a flowchart illustrating an outline of feature amount output processing performed in the information processing apparatus 1 according to the first example embodiment. The feature amount output processing of the first example embodiment is started when, for example, a command of the feature amount output processing is issued to the information processing apparatus 1 by a user operation or the like. However, the timing at which the feature amount output processing according to the first example embodiment is performed is not particularly limited, and may be the time at which the information processing apparatus 1 acquires the biometric image or the time at which an instruction to execute the biometric matching is issued. When the feature amount output unit 112 includes a machine learning model, the processing in FIG. 3 may be performed in the scene of learning of the machine learning model using the learning data, or may be performed in the scene of feature amount calculation using the learned machine learning model.

In step S11, the image information acquisition unit 111 extracts and acquires direction information and quality information from the biometric image. The direction information and the quality information can be acquired for each pixel or for each predetermined region including a plurality of pixels by performing image processing on luminance value data of a plurality of pixels constituting the biometric image.

The direction information is information indicating a characteristic direction of a pattern included in the biometric image. For example, when the biometric image is a fingerprint image, the direction information may be a vector indicating a direction in which a ridge of the fingerprint flows (a tangential direction of the ridge). For example, when the biometric image is an iris image, the direction information may be a vector indicating the direction of the gradient of the luminance value of the iris.

The quality information is information indicating whether quality is good or not in the extraction of the above-described direction information. For example, when the pattern is unclear due to the presence of scratches or the like in the biometric image, it is determined that the quality is low. In addition, it is determined that a portion from which a pattern cannot be extracted, such as a background portion (for example, outside a portion in which a finger appears) in a fingerprint image, is also of low quality.

An example of a method of extracting quality information when a biometric image is a fingerprint image will be described. A plurality of types of template images for quality information extraction are prepared in advance. Each of the plurality of types of template images includes stripe patterns having different directions or different pitches. Next, a region of the fingerprint image from which quality information is extracted is selected as a partial image. Fitting is performed so that this partial image is reproduced by linear sum of a plurality of types of template images, and the regression coefficient of the fitting is optimized. An evaluation value based on the number of template images in which the regression coefficient obtained in this manner is other than zero can be used as quality information in the region of the partial image. In a case where the direction and width of the ridges in the partial image are uniform, the ridges can be fitted with a small number of template images since they are simple pattern. In such a case, a high evaluation value is given to the region, and it is determined that the region is a high-quality region suitable for extraction of direction information. On the other hand, when the direction and the width of the ridge line in the partial image are complicated or when there is no pattern, a large number of template images are required for fitting. In such a case, a low evaluation value is given to the region, and it is determined that the region is a low-quality region which is not suitable for extracting the direction information. Note that a method of extracting quality information is not limited to this, and for example, a cumulative value of luminance variations in a direction along the direction information may be used as a reference for quality.

In step S12, the image information acquisition unit 111 generates an image information vector Vi having a direction associated with the direction information and a length associated with the quality information. The image information vector Vi is generated for each pixel or for each predetermined region including a plurality of pixels. When q is the evaluation value of the scalar quantity corresponding to the quality information and e is the angle indicating the direction of the ridge line corresponding to the direction information, the image information vector Vi is given by the following expression (1).

$$Vi = (q \cdot \cos\theta, q \cdot \sin\theta) \qquad (1)$$

As can be understood from the expression (1), assuming that the length of the image information vector Vi is equal to |Vi|, |Vi| is equal to q. Accordingly, the image information vector Vi is adjusted to have a length of q by performing a scalar multiplication operation on the direction vector indicating the direction information. For example, when the direction vector is a unit vector, the image information vector Vi can be calculated by multiplying the direction vector by q. Note that q is preferably 0 or more and 1 or less. In this case, the range of each element of the image information vector Vi can be limited to not less than −1 and not more than 1, and data can be easily handled.

Figure 4:
FIG. 4 is a schematic diagram illustrating an example of a fingerprint image.
Figure 5:
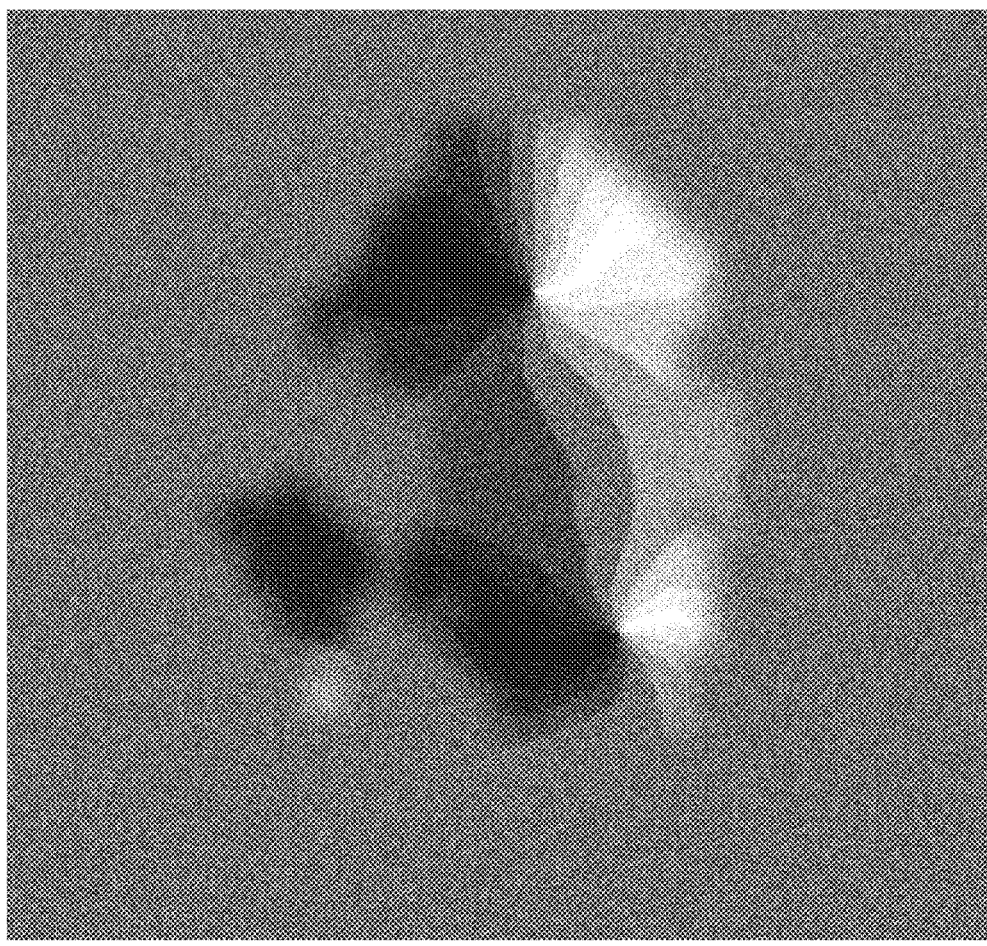
FIG. 5 is a schematic diagram illustrating an example in which a first component of an image information vector is mapped to a plane.
Figure 6:
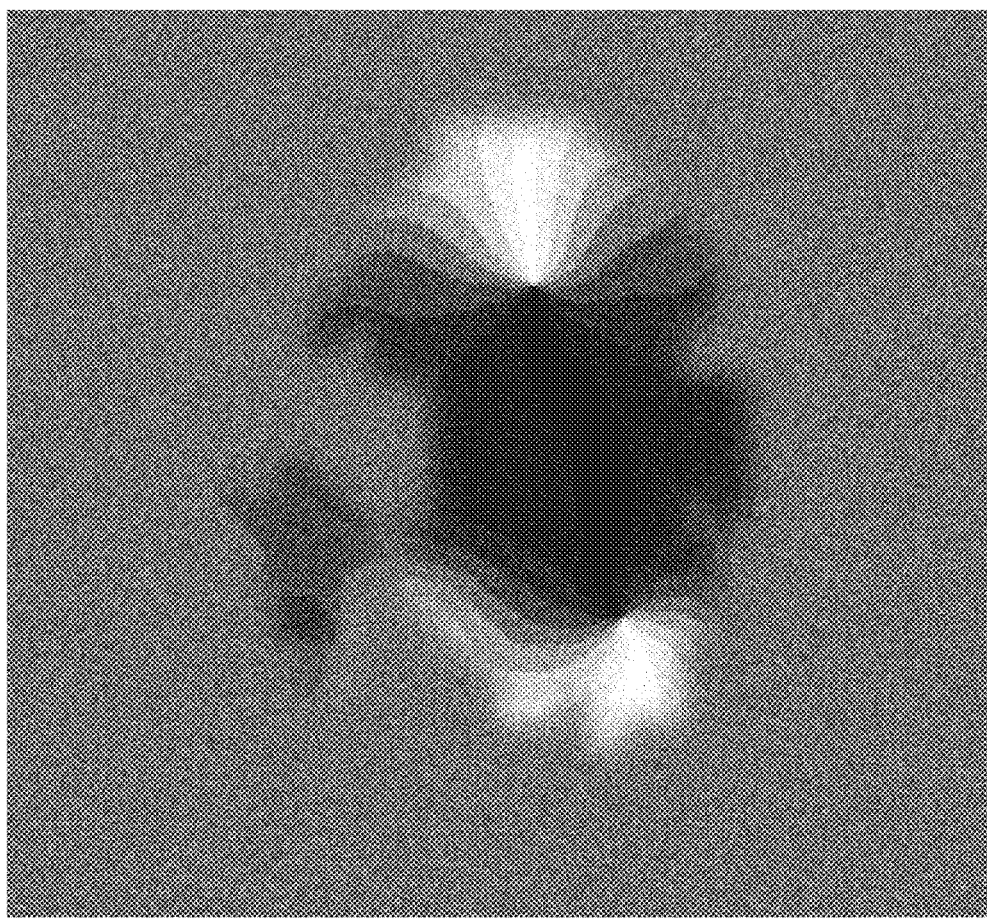
FIG. 6 is a schematic diagram illustrating an example in which a second component of an image information vector is mapped to a plane.

Generation of the image information vector Vi in step S12 will be described in detail with a specific example of calculation. FIG. 4 is a schematic diagram illustrating an example of a fingerprint image. FIG. 5 is a schematic diagram illustrating an example in which the first component of the image information vector Vi is mapped to a plane. FIG. 6 is a schematic diagram illustrating an example in which the second component of the image information vector Vi is mapped to a plane.

In FIG. 4, a stripe pattern near the center indicates ridges of the fingerprint. A gray region outside the fingerprint indicates a region where the fingerprint is not included. As illustrated in FIG. 4, a biometric image such as a fingerprint image may include an unclear portion and an outer peripheral region.

FIG. 5 illustrates the first component of the image information vector Vi, that is, q·cos θ in the expression (1), mapped on a plane so as to correspond to the fingerprint image. The shading at each point in FIG. 5 indicates the value of q·cos θ. More specifically, in FIG. 5, the black portion corresponds to −q, the gray portion corresponds to zero, and the white portion corresponds to +q. As can be appreciated by comparing FIG. 4 and FIG. 5, the white or black portion of FIG. 5 illustrates a portion where there is a horizontal component in the ridges and the ridges appear sharply in FIG. 4. The gray portion of the outer periphery is a region in which no fingerprint is included. Therefore, in the outer periphery, the value of q is close to zero.

FIG. 6 illustrates the second component of the image information vector Vi, that is, q·sin θ in the expression (1), mapped on a plane so as to correspond to the fingerprint image. The shading at each point in FIG. 6 indicates the value of q sine. More specifically, in FIG. 6, the black portion corresponds to −q, the gray portion corresponds to zero, and the white portion corresponds to +q. As can be understood by comparing FIG. 4 and FIG. 6, the white or black portion of FIG. 6 illustrates a portion where there is a vertical component in the ridges and the ridges appears sharply in FIG. 4. The gray portion of the outer periphery is a region in which no fingerprint is included. Therefore, in the outer periphery, the value of q is close to zero.

As described above, the image information vector Vi holds the image information in a form in which the information indicating the quality is superimposed on the information indicating the direction of the pattern of the biometric image.

In step S13, the feature amount output unit 112 calculates the image information vector Vi as input data, and outputs a feature amount. Note that the feature amount may typically be a vector quantity. When the processing of FIG. 3 is learning processing of a machine learning model using learning data, the output feature amount can be used as optimization data of the machine learning model. When the processing of FIG. 3 is a scene for calculating a feature amount using a learned machine learning model, the output feature amount can be used as input data for matching in biometric matching.

As described above, the image information acquisition unit 111 performs the processing of generating the image information vector Vi from the biometric image as the preprocessing of the processing in the feature amount output unit 112 that outputs the feature amount. The image information vector Vi has an angle θ indicating a direction associated with the direction information and a length q associated with the quality information. The effect of this processing will be described.

As in the outer peripheral portion of the fingerprint illustrated in FIG. 4, a region not suitable for feature extraction may be included in the biometric image. By including the quality information in the input data for generating the feature amount, it is possible to generate the feature amount in consideration of the influence of the region not suitable for such feature extraction. However, since the value itself indicating the quality does not indicate the feature of the living body in the biometric image, it may be difficult to incorporate the quality information into the input data depending on the algorithm for generating the feature amount.

On the other hand, in the first example embodiment, the direction information is associated with the angle θ of the image information vector Vi, and the quality information is associated with the length q. The quality information can be incorporated without affecting the angle θ indicating the feature of the living body. In addition, since the length of the image information vector Vi decreases when the evaluation value of the quality included in the quality information is low, the contribution degree of the region not suitable for the feature extraction in the feature extraction automatically decreases. For example, in the peripheral portion of the biometric image, since the quality evaluation value is close to 0 and the image information vector Vi is almost zero vector, the contribution to feature extraction is small. Thus, by inputting the image information vector Vi to the feature amount output unit 112, the feature amount can be generated in consideration of the quality. Therefore, according to the first example embodiment, there is provided the information processing apparatus 1 capable of realizing the biometric matching with higher accuracy than the conventional information processing apparatus.

Second Example Embodiment

Hereinafter, a second example embodiment will be described. In the second example embodiment, an example in which a neural network is used as a machine learning model of the feature amount output unit 112 will be described as an example in which the information processing apparatus 1 of the first example embodiment is more specific. The description of the same elements as those of the first example embodiment may be omitted or simplified.

Figure 7:
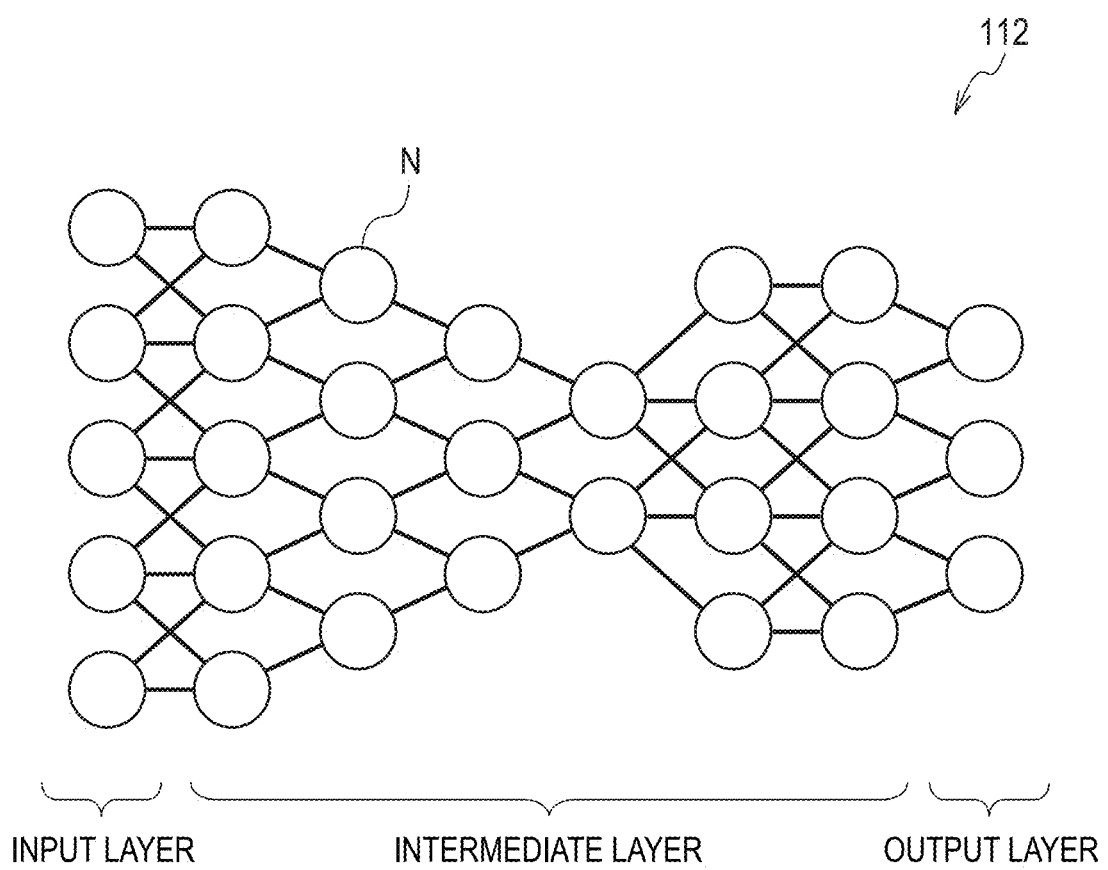
FIG. 7 is a schematic diagram of a neural network according to a second example embodiment.

FIG. 7 is a schematic diagram of a neural network according to the second example embodiment. In the second example embodiment, the feature amount output unit 112 includes a neural network. The neural network has a plurality of nodes N interconnected to form a plurality of layers including an input layer, an intermediate layer, and an output layer.

The image information vector Vi acquired by the image information acquisition unit 111 is input to the input layer. Each node N in a certain layer performs an operation using an activation function including an input value, a weighting coefficient, and a bias value input from a plurality of nodes N in the previous layer, and outputs the operation result to a node N in the next layer. The node N of the output layer outputs data based on an input from the node N of the previous layer as a feature amount.

In the example of the neural network described above, the machine learning model that can be included in the feature amount output unit 112 corresponds to the structure of the neural network, the weighting coefficient and the bias value included in the activation function. Learning corresponds to appropriately determining weighting coefficients and bias values using learning data. The learned machine learning model is a machine learning model in which weighting coefficients and bias values have already been appropriately determined. By learning such that features can be appropriately extracted from the input image information vector Vi, the neural network can generate a feature amount from the image information vector Vi.

Since the input layer of the neural network is configured so that target data for feature extraction is input, it is difficult to further input data different from the target data for feature extraction. Therefore, it is difficult to input quality information separately from direction information indicating feature of a living body. On the other hand, as described in the first example embodiment, since quality information is incorporated in the image information vector Vi, by using the image information vector Vi as the input data, the data including the quality information can be directly input to the input layer of the neural network. As described above, the image information vector Vi of the first example embodiment can be suitably applied to the feature extraction using the neural network as the machine learning model as in the second example embodiment. Therefore, according to the second example embodiment, there is provided the information processing apparatus 1 capable of realizing more suitable biometric matching.

Note that the schematic diagram of the neural network illustrated in FIG. 7 is simplified for convenience of illustration, and the actual number of layers, the number of nodes, and the like can be much larger than those illustrated in FIG. 7. Further, in the example of the neural network illustrated in FIG. 7, one node N of a certain layer is not connected to some nodes N of the previous layer, but all nodes N of the previous layer may be connected to each node N of the certain layer. Such a layer may also be referred to as a fully connected layer.

The feature amount output unit 112 may include a convolutional neural network which is a kind of neural network. Convolutional neural networks are known to be effective in image processing and are suitable for processing biometric images.

Third Example Embodiment

Hereinafter, a third example embodiment will be described. The biometric matching apparatus of the third example embodiment performs biometric matching by comparing feature amount including the plurality of feature amounts. Each of the plurality of feature amounts may be extracted from the biometric information using the information processing apparatus 1 of the first example embodiment or the second example embodiment, or may be extracted from the biometric information using feature amount extraction means other than those. The description of the same elements as those of the first example embodiment or the second example embodiment may be omitted or simplified.

Figure 8:
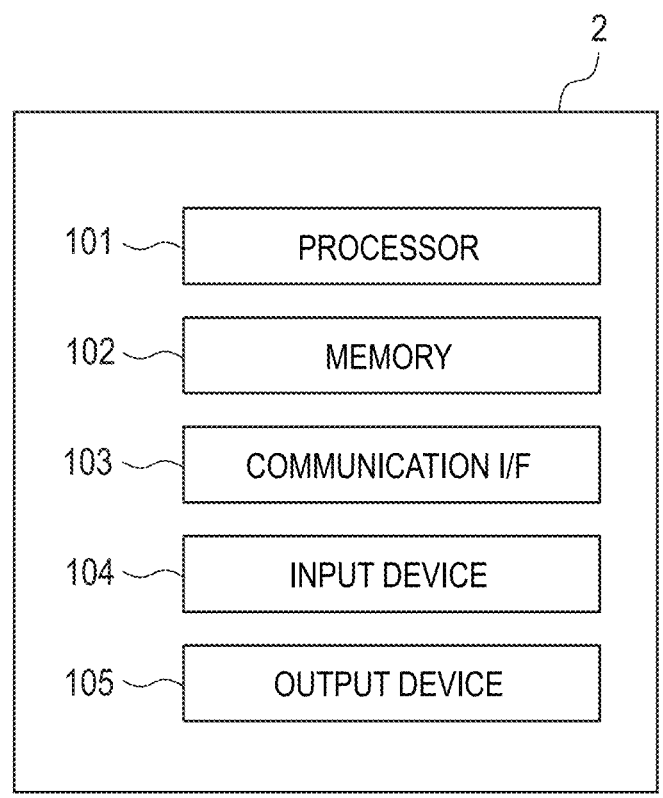
FIG. 8 is a block diagram illustrating a hardware configuration of an information processing apparatus according to a third example embodiment.

FIG. 8 is a block diagram illustrating a hardware configuration example of a biometric matching apparatus 2. The biometric matching apparatus 2 may be a computer such as a personal computer (PC), a processing server, a smartphone, or a microcomputer. The information processing apparatus 1 includes a processor 101, a memory 102, a communication interface (I/F) 103, an input device 104, and an output device 105. Since the configuration of each of these devices is the same as the configuration of the information processing apparatus 1 in the first example embodiment, the description thereof will be omitted. The components of the biometric matching apparatus 2 are connected to each other via a bus, a wiring, a driving device, and the like (not illustrated).

In FIG. 8, the biometric matching apparatus 2 is configured by one device, but the configuration of the biometric matching apparatus 2 is not limited thereto. For example, the biometric matching apparatus 2 may be a biometric matching system including one or a plurality of devices. In addition, other devices may be added to the biometric matching apparatus 2, or a part of the devices may not be provided. Some devices may be replaced with other devices having similar functions. Further, some functions of the biometric matching apparatus 2 may be provided by another apparatus via a network, and the functions of the third example embodiment may be distributed among a plurality of apparatuses. For example, the memory 102 may include cloud storage, which is a storage device provided in another measure. As described above, the hardware configuration of the biometric matching apparatus 2 can be appropriately changed.

The biometric matching apparatus 2 may be configured by a single hardware shared with the information processing apparatus 1 of the first example embodiment or the second example embodiment. Further, the biometric matching apparatus 2 may be communicably connected to the information processing apparatus 1 of the first example embodiment or the second example embodiment to configure an integrated system. In these configurations, the feature amount output from the information processing apparatus 1 of the first example embodiment or the second example embodiment can be input to the biometric matching apparatus 2.

Figure 9:
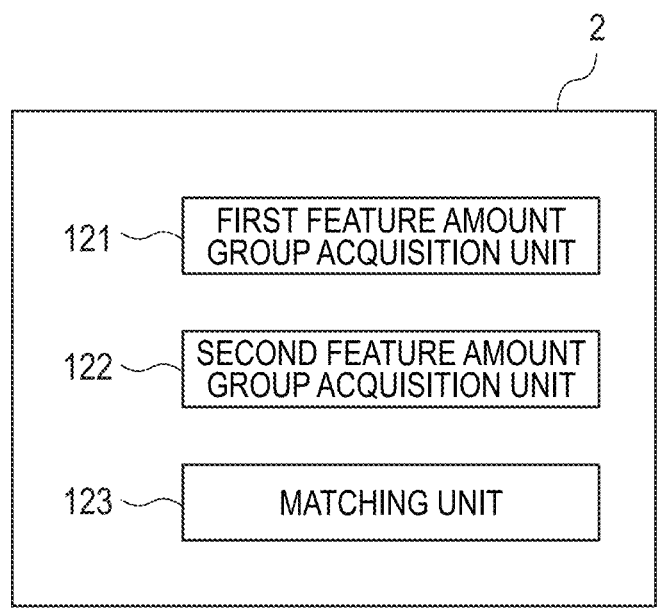
FIG. 9 is a functional block diagram of a biometric matching apparatus according to the third example embodiment.

FIG. 9 is a functional block diagram of the biometric matching apparatus 2 according to the third example embodiment. The biometric matching apparatus 2 includes a first feature amount group acquisition unit 121, a second feature amount group acquisition unit 122, and a matching unit 123.

The processor 101 performs predetermined arithmetic processing by executing a program stored in the memory 102. The processor 101 controls the memory 102, the communication I/F 103, the input device 104, and the output device 105 based on the program. Thus, the processor 101 realizes the functions of the first feature amount group acquisition unit 121, the second feature amount group acquisition unit 122, and the matching unit 123. The first feature amount group acquisition unit 121, the second feature amount group acquisition unit 122, and the matching unit 123 may be referred to more generally as a first feature amount group acquisition means, a second feature amount group acquisition means, and a matching means, respectively.

Figure 10:
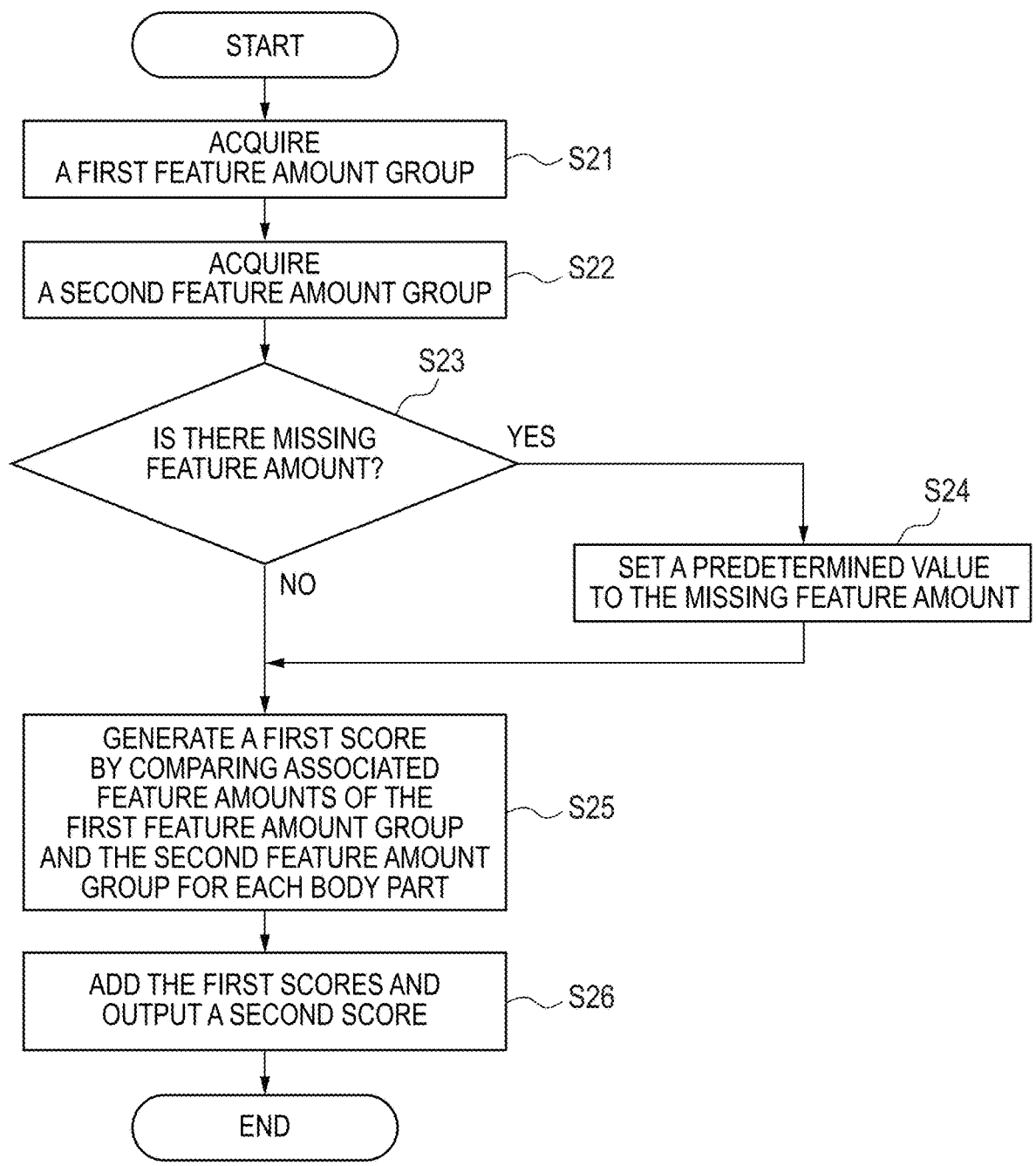
FIG. 10 is a flowchart illustrating an outline of matching processing performed in the biometric matching apparatus according to the third example embodiment.

FIG. 10 is a flowchart illustrating an outline of the matching processing performed in the biometric matching apparatus 2 according to the third example embodiment. The matching processing of the third example embodiment is started when, for example, a command of the matching processing is issued to the biometric matching apparatus 2 by a user operation or the like. However, the timing at which the matching processing of the third example embodiment is performed is not particularly limited, and may be the time at which the feature amount is input to the biometric matching apparatus 2.

In the flowchart of FIG. 10, it is assumed that the biometric matching apparatus 2 is an apparatus that calculates a score (a second score to be described later) used for determining whether or not a first target person and a second target person are the same person. The attributes of the first target person and the second target person are not particularly limited, but for example, the first target person and the second target person may be the matching target person and the preregistered person, respectively. For example, in the case where the biometric matching apparatus 2 is used to determine whether or not the passage of the door is permitted, the first target person may be a person that passes the door, and the second target person may be a registered person registered in advance as a person having the passage authority of the door. It is assumed that the feature amount for the biometric matching is extracted from a biometric image or the like in advance and is stored in a storage medium such as the memory 102, but the biometric image and feature amount may be extracted together as a series of processes before the process of the flowchart of FIG. 10.

In step S21, the first feature amount group acquisition unit 121 acquires a first feature amount group including a plurality of feature amounts. In step S22, the second feature amount group acquisition unit 122 acquires a second feature amount group including a plurality of feature amounts. The plurality of feature amounts extracted from the biometric image or the like may be stored in advance in the storage medium as described above. In this case, the first feature amount group acquisition unit 121 and the second feature amount group acquisition unit 122 acquire the first feature amount group and the second feature amount group by reading a plurality of feature amounts from the storage medium. The plurality of feature amounts are extracted from a plurality of body parts of the first target person or the second target person, respectively. The plurality of body parts may be, for example, a plurality of fingers, both hands, irises of both eyes, and the like. A plurality of feature amounts corresponding to a plurality of body parts are generated by extracting features such as fingerprints, palm prints, and iris patterns from images of a plurality of fingers, both hands, and irises of both eyes. The plurality of fingers may be, for example, ten fingers of both hands, but may be thumbs of both hands.

FIG. 11 is a table illustrating the first feature amount group and the second feature amount group according to the third example embodiment. FIG. 11 illustrates a configuration of data when each of the first feature amount group and the second feature amount group includes feature amounts acquired from the ten fingers of both hands. As illustrated in FIG. 11, the first feature amount includes a plurality of feature amounts F1 [1], F1 [2], . . . , and F1. For example, the feature amount F1 [1] is a feature amount extracted from the image of the thumb of the right hand of the first target person. The second feature amount group includes a plurality of feature amounts F2 [1], F2 [2], . . . , and F2 [10]. For example, the feature amount F2 [1] is a feature amount extracted from the image of the thumb of the right hand of the second target person. In this way, the feature amounts of the first target person and the second target person corresponding to each of the plurality of body parts are acquired. Since the first feature amount group and the second feature amount group are associated with the body part from which the feature amount is acquired, the feature amounts of the same body part can be compared with each other.

In step S23, the matching unit 123 determines whether or not at least one of the first feature amount group and the second feature amount group has missing feature amount. When at least one of the first feature amount group and the second feature amount group has missing feature amounts (YES in step S23), the process proceeds to step S24. When there is missing feature amount in neither the first feature amount group nor the second feature amount group (NO in step S23), the process proceeds to step S25. Here, specific examples of missing feature amount include a case where images of some fingers out of ten fingers are not acquired and feature amounts cannot be extracted, a case where images of some fingers are unclear and feature amounts with sufficient accuracy cannot be acquired, and the like.

In step S24, the matching unit 123 sets a predetermined value to the missing feature amount. Then, the process proceeds to step S25.

In step S25, the matching unit 123 compares associated feature amounts of the first feature amount group and the second feature amount group for each body part. Then, the matching unit 123 generates a first score for each body part.

In step S26, the matching unit 123 adds up the first score for each body part to generate a second score. Then, the matching unit 123 outputs the second score. The second score is used, for example, to determine whether or not the first target person and the second target person are the same person. For example, it may be determined that the first target person and the second target person are the same person when the second score is equal to or greater than a predetermined threshold value, and it may be determined that the first target person and the second target person are different persons when the second score is less than the predetermined threshold value. Such determination processing based on the second score may be performed in the biometric matching apparatus 2, or may be performed in another determination device.

As described above, according to the third example embodiment, in the matching method of comparing the feature amount groups each including a plurality of feature amounts, matching can be performed even when there is missing feature amount. Further, even when there is missing feature amount, it is not necessary to change the matching algorithm for generating the first score and the second score, and the same algorithm can be used as it is, so that the conditional branch of switching the matching algorithms can be eliminated, and the processing can be simplified. Therefore, according to the third example embodiment, the biometric matching apparatus 2 capable of realizing more suitable biometric matching is provided.

Although the predetermined value set in step S24 is arbitrary, it is desirable that the predetermined value is set to a value such that the first score indicates that the feature amount to be compared is uncorrelated. By setting in this manner, it is possible to prevent the first score calculated based on the predetermined value from affecting the value of the second score in the summation processing in step S26.

Fourth Example Embodiment

Hereinafter, a fourth example embodiment will be described. The biometric comparison apparatus of the fourth example embodiment is an example in which the calculation processing performed by the matching unit 123 of the third example embodiment is more embodied. The description of the same elements as those of the first to third example embodiments may be omitted or simplified.

The processing other than the processing in steps S24, S25, and S26 in FIG. 10 is similar to that in the third example embodiment, and thus description thereof is omitted. In the processing of steps S25 and S26, the matching unit 123 of the fourth example embodiment calculates the first score and the second score based on the cosine similarity.

A plurality of feature amounts included in the first feature amount group are F1 [1], F1 [2], . . . , and F1 [n], and a plurality of feature amounts included in the second feature amount group are F2 [1], F2 [2], . . . , and F2 [n]. Further, each of F1 [1], F1 [2], . . . , F1 [n], F2 [1], F2 [2], . . . , F2 [n] is a vector quantity. Here, n is the number of a plurality of body parts from which feature amount are extracted. For example, when a plurality of body parts are fingers, n is 10. When multiple body parts are irises of both eyes, n is 2.

The cosine similarity cos (a, b) is expressed by the following expression (2). Where a·b is the inner product of the vector a and the vector b, and |a| is the length of the vector a.

$$\cos(a, b) = (a \cdot b)/(|a||b|) \qquad (2)$$

When the length of each vector is normalized to 1 (that is, when the vector is a unit vector), expression (2) is simplified as expression (3) below. In this case, the cosine similarity cos (a, b) can be regarded as the inner product a·b. This operation is a multiply-accumulate operation, and can be performed at high-speed using a computer.

$$\cos(a, b) = a \cdot b \quad (3)$$

As illustrated in the above expression (3), the cosine similarity represents the closeness of the angle formed between the vectors. The closer the cosine similarity of the two feature amount is to 1, the more similar they are, and when the cosine similarity is 0, it can be said that both are uncorrelated. Further, since the cosine similarity is a value ranging from −1 to 1, in the case of calculating scores for a plurality of body parts as in the fourth example embodiment, the comparison results of the plurality of body parts can be easily integrated by adding the cosine similarity of each body part.

In the fourth example embodiment, the first score calculated in step S25 is the cosine similarity between the feature amount included in the first feature amount group and the feature amount included in the second feature amount group. The second score calculated in step S26 is obtained by adding the cosine similarity of each feature amount for a plurality of body parts. When the processing of step S25 and the processing of step S26 are summarized, the second score SC2 is represented by the following expression (4). Here, k is an integer from 1 to n, the length of each feature amount is all normalized to 1, and $\Sigma$ denotes the sum of terms in which k is from 1 to n. In expression (4), F1 [k]·F2 [k] correspond to the first score.

$$SC2 = \Sigma(F1[k] \cdot F2[k]) \quad (4)$$

In the fourth example embodiment, the predetermined value given to the missing feature amount in step S24 is a zero vector. When one of F1 [k] and F2 [k] is a zero vector, F1 [k]·F2 [k] are zero. Therefore, the first score corresponding to the missing feature amount is zero. This indicates that F1 [k] and F2 [k] are uncorrelated due to the property of cosine similarity. Therefore, the second score can be calculated while invalidating the missing feature amounts so as not to affect the calculation result.

As described above, in the fourth example embodiment, when cosine similarity is applied to score calculation, missing feature amount are set to zero vectors, whereby missing feature can amount be invalidated without changing the calculation formula of scores by conditional branching. Therefore, according to the fourth example embodiment, the biometric matching apparatus 2 capable of realizing more suitable biometric matching is provided.

The apparatuses or systems described in the above example embodiments can also be configured as in a fifth example embodiment or a sixth example embodiment.

Fifth Example Embodiment

Figure 12:
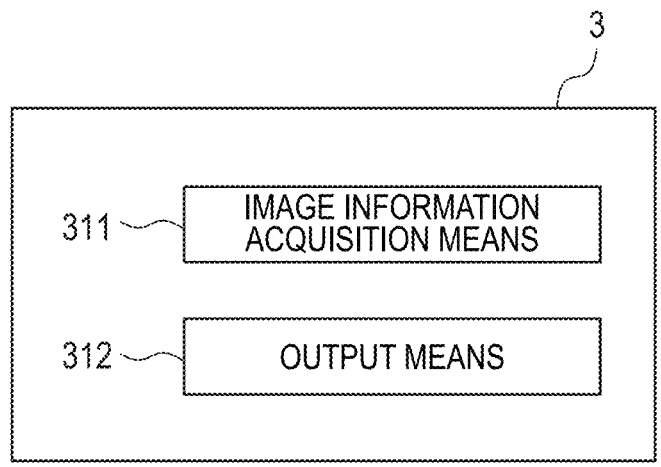
FIG. 12 is a functional block diagram of an information processing apparatus according to a fifth example embodiment.

FIG. 12 is a functional block diagram of the information processing system 3 according to the fifth example embodiment. The information processing system 3 includes an image information acquisition means 311 and an output means 312. The image information acquisition means 311 acquires direction information and quality information indicating quality of the direction information from a biometric image. The output means 312 outputs a feature amount of the biometric image by inputting a vector having a direction associated with the direction information and a length associated with the quality information.

According to the fifth example embodiment, there is provided an information processing system 3 capable of realizing more suitable biometric matching.

Sixth Example Embodiment

Figure 13:
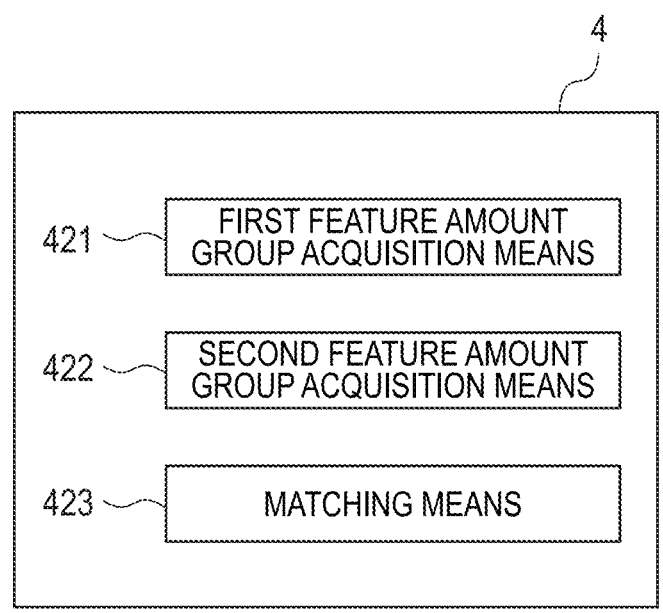
FIG. 13 is a functional block diagram of an information processing apparatus according to a sixth example embodiment.

FIG. 13 is a functional block diagram of the biometric matching system 4 according to the sixth example embodiment. The biometric matching system 4 includes a first feature amount group acquisition means 421, a second feature amount group acquisition means 422, and a matching means 423. The first feature amount group acquisition means 421 acquires a first feature amount group including a plurality of feature amounts respectively extracted from a plurality of body parts of a first target person. The second feature amount group acquisition means 422 acquires a second feature amount group including a plurality of feature amounts respectively extracted from the plurality of body parts of the second target person. The matching means 423 calculates a first score by comparing a feature amount included in the first feature amount group with the feature amount included in the second feature amount group for each of the plurality of body parts, and outputs a second score obtained by adding a plurality of the first scores respectively associated with the plurality of body parts. The matching means 423 sets a predetermined value to a missing feature amount when at least one of the first feature amount group and the second feature amount group misses a part of the feature amounts.

According to the sixth example embodiment, the biometric matching system 4 capable of realizing more suitable biometric matching is provided.

Modified Example Embodiments

This disclosure is not limited to the above-described example embodiments, and can be appropriately modified without departing from the gist of this disclosure. For example, examples in which some of the configurations of any of the example embodiments are added to other example embodiments or examples in which some of the configurations of any of the example embodiments are replaced with some of the configurations of other example embodiments are also example embodiments of this disclosure.

In the first example embodiment or the second example embodiment, the biometric image is desirably an image of a fingerprint, a palm print, or a blood vessel. In the case where the biometric image is such an image, the direction information that can be acquired from the biometric image is the direction of the ridge line included in the fingerprint or palm print or the direction of the line appearing by the shading of the blood vessel portion. When a vector is extracted from these pieces of direction information, a feature is included in a direction component, but a feature is not included in a length component. Therefore, even if the quality information is incorporated in the length of the vector as in the first example embodiment or the second example embodiment, the performance of the feature extraction does not deteriorate. Therefore, the configuration of the first example embodiment or the second example embodiment is suitable when the biometric image is a fingerprint, a palm print, or a blood vessel image.

In the first example embodiment or the second example embodiment, the biometric image is also preferably an iris image. If the biometric image is an iris image, the direction information that may be acquired from the biometric image is the direction of the iris luminance gradient. When a vector is extracted from these pieces of direction information, many features are included in the direction component, but no more features are included in the length component, that is, the magnitude of the gradient. Therefore, even if the quality information is incorporated in the length of the vector as in the first example embodiment or the second example embodiment, the performance of the feature extraction does not deteriorate much. Therefore, the configuration of the first example embodiment or the second example embodiment is suitable for a case where the biometric image is an iris image.

In the third example embodiment or the fourth example embodiment, it is desirable that the plurality of body parts be a plurality of fingers, an iris of both hands, or both eyes. In the case where the biometric image is those images, since a plurality of feature amounts can be acquired from the same type of part, even if the feature amount of one part are missing, there is a high possibility that the feature amount can be complemented by the feature amount of other parts. Therefore, the configuration of the third example embodiment or the fourth example embodiment is suitable for a case where a plurality of body parts are a plurality of fingers, both hands, or irises of both eyes.

A processing method in which a program for operating the configuration of the above-described example embodiments are recorded in a storage medium so as to realize the functions of the above-described example embodiments, the program stored in the storage medium is read out as a code, and executed in a computer is also included in the scope of each example embodiment. That is, a computer-readable storage medium is also included in the scope of each example embodiment. In addition, not only the storage medium storing the above-described program but also the program itself are included in each example embodiment. Further, one or more components included in the above-described example embodiment may be a circuit such as an ASIC or an FPGA configured to realize the functions of the components.

Examples of the storage medium include a floppy disk, a hard disk, an optical disk, a magneto-optical disk, a CD (Compact Disk)-ROM, a magnetic tape, a non-volatile memory card, and a ROM. In addition, the scope of each example embodiment includes not only a system in which a program stored in the storage medium is executed by itself but also a system in which a program is in executed by operating on an OS (Operating System) cooperation with other software and functions of an expansion board.

The service implemented by the functions of the above-described example embodiments can also be provided to the user in the form of Saas (Software as a Service).

It should be noted that any of the above-described example embodiments is merely an example of an example embodiment for carrying out this disclosure, and the technical scope of this disclosure should not be interpreted as being limited by the example embodiments. That is, this disclosure can be implemented in various forms without departing from the technical idea or the main characteristics thereof.

The whole or part of the example embodiments disclosed above can be described as, but not limited to, the following supplementary notes.

(Supplementary Note 1)
An information processing system comprising:
an image information acquisition means for acquiring direction information and quality information indicating quality of the direction information from a biometric image; and
an output means for outputting a feature amount of the biometric image by inputting a vector having a direction associated with the direction information and a length associated with the quality information.

(Supplementary Note 2)
The information processing system according to supplementary note 1,
wherein the biometric image is an image of a fingerprint, a palm print, or a blood vessel, and
wherein the direction information indicates a direction of a line by the fingerprint, the palm print, or the blood vessel.

(Supplementary Note 3)
The information processing system according to supplementary note 1,
wherein the biometric image is an iris image, and
wherein the direction information indicates a direction of a luminance gradient of the iris.

(Supplementary Note 4)
The information processing system according to any one of supplementary notes 1 to 3,
wherein the output means includes a neural network having an input layer and an output layer,
wherein the vector is input to the input layer, and
wherein the feature amount is output from the output layer.

(Supplementary Note 5)
An information processing method comprising:
acquiring direction information and quality information indicating quality of the direction information from a biometric image; and
outputting a feature amount of the biometric image by inputting a vector having a direction associated with the direction information and a length associated with the quality information.

(Supplementary Note 6)
A storage medium storing an information processing program that causes a computer to execute an information processing method comprising:
acquiring direction information and quality information indicating quality of the direction information from a biometric image; and
outputting a feature amount of the biometric image by inputting a vector having a direction associated with the direction information and a length associated with the quality information.

(Supplementary Note 7)
A biometric matching system comprising:
a first feature amount group acquisition means for acquiring a first feature amount group including a plurality of feature amounts respectively extracted from a plurality of body parts of a first target person;
a second feature amount group acquisition means for acquiring a second feature amount group including a plurality of feature amounts respectively extracted from the plurality of body parts of a second target person; and
a matching means for calculating a first score by comparing a feature amount included in the first feature amount group with a feature amount included in the second feature amount group for each of the plurality of body parts, and outputting a second score obtained by adding a plurality of the first scores respectively associated with the plurality of body parts, wherein the matching means sets a predetermined value to a missing feature amount when at least one of the first feature amount group and the second feature amount group misses a part of the feature amounts.

(Supplementary Note 8)

The biometric matching system according to supplementary note 7, wherein the first score calculated when the predetermined value is set is a value indicating that a feature amount to be compared is uncorrelated.

(Supplementary Note 9)

The biometric matching system according to supplementary note 7 or 8, wherein the matching means calculates the first score based on a cosine similarity between a feature amount included in the first feature amount group and a feature amount included in the second feature amount group, and wherein the feature amount set with the predetermined value is a zero vector.

(Supplementary Note 10)

The biometric matching system according to any one of supplementary notes 7 to 9, wherein the plurality of body parts is a plurality of fingers, both hands, or irises of both eyes.

(Supplementary Note 11)

A biometric matching method comprising:

acquiring a first feature amount group including a plurality of feature amounts respectively extracted from a plurality of body parts of a first target person;

acquiring a second feature amount group including a plurality of feature amounts respectively extracted from the plurality of body parts of a second target person; and calculating a first score by comparing a feature amount included in the first feature amount group with a feature amount included in the second feature amount group for each of the plurality of body parts, and outputting a second score obtained by adding a plurality of the first scores respectively associated with the plurality of body parts, wherein a predetermined value is set to a missing feature amount when at least one of the first feature amount group and the second feature amount group misses a part of the feature amounts.

(Supplementary Note 12)

A storage medium storing a biometric matching program for causing a computer to execute a biometric matching method comprising:

acquiring a first feature amount group including a plurality of feature amounts respectively extracted from a plurality of body parts of a first target person;

acquiring a second feature amount group including a plurality of feature amounts respectively extracted from the plurality of body parts of a second target person; and calculating a first score by comparing a feature amount included in the first feature amount group with a feature amount included in the second feature amount group for each of the plurality of body parts, and outputting a second score obtained by adding a plurality of the first scores respectively associated with the plurality of body parts, wherein a predetermined value is set to a missing feature amount when at least one of the first feature amount group and the second feature amount group misses a part of the feature amounts.

REFERENCE SIGNS LIST 1 information processing apparatus
2 biometric matching apparatus
3 information processing system
4 biometric matching system
101 processor
102 memory
103 communication I/F
104 input device
105 output device
111 image information acquisition unit
112 feature amount output unit
121 first feature amount group acquisition unit
122 second feature amount group acquisition unit
123 matching unit
311 image information acquisition means
312 output means
421 first feature amount group acquisition means
422 second feature amount group acquisition means
423 matching means

What is claimed is:

1. A biometric matching system comprising:
a memory configured to store instructions; and
a processor configured to execute the instructions to:
acquire a first feature amount group including a plurality of first vectors respectively extracted from a plurality of body parts of a first target person;
acquire a second feature amount group including a plurality of second vectors respectively extracted from the plurality of body parts of a second target person; and
calculate a plurality of first scores of the plurality of body parts by comparing the plurality of first vectors included in the first feature amount group with the plurality of second vectors included in the second feature amount group, respectively, and output a second score obtained by adding the plurality of first scores respectively associated with the plurality of body parts,
wherein a predetermined value is set to a missing vector of the plurality of first vectors or the plurality of second vectors when at least one of the first feature amount group and the second feature amount group misses a part of the plurality of first vectors or the plurality of second vectors.

2. The biometric matching system according to claim 1, wherein the predetermined value is set is a value indicating that vectors of the plurality of first vectors and the plurality of second vectors to be compared are uncorrelated.

3. The biometric matching system according to claim 1, wherein the plurality of first score are calculated based on a cosine similarities between the plurality of first vectors included in the first feature amount group and the plurality of second vectors included in the second feature amount group, and
wherein a vector of the plurality of first vectors and the plurality of second vectors set with the predetermined value is a zero vector.

4. The biometric matching system according to claim 1, wherein the plurality of body parts is a plurality of fingers, both hands, or irises of both eyes.

5. A biometric matching method comprising:
acquiring a first feature amount group including a plurality of first vectors-respectively extracted from a plurality of body parts of a first target person;

acquiring a second feature amount group including a plurality of second vectors respectively extracted from the plurality of body parts of a second target person; and calculating a plurality of first scores of the plurality of body parts by comparing the plurality of first vectors included in the first feature amount group with the plurality of second vectors included in the second feature amount group, respectively, and outputting a second score obtained by adding the plurality of first scores respectively associated with the plurality of body parts, wherein a predetermined value is set to a missing vector of the plurality of first vectors or the plurality of second vectors when at least one of the first feature amount group and the second feature amount group misses a part of the plurality of first vectors or the plurality of second vectors.

6. A non-transitory storage medium storing a biometric matching program for causing a computer to execute a biometric matching method comprising:

acquiring a first feature amount group including a plurality of first vectors respectively extracted from a plurality of body parts of a first target person;

acquiring a second feature amount group including a plurality of second vectors respectively extracted from the plurality of body parts of a second target person; and calculating a plurality of first scores of the plurality of body parts by comparing the plurality of first vectors included in the first feature amount group with the plurality of second vectors included in the second feature amount group, respectively, and outputting a second score obtained by adding the plurality of first scores respectively associated with the plurality of body parts, wherein a predetermined value is set to a missing vector of the plurality of first vectors or the plurality of second vectors when at least one of the first feature amount group and the second feature amount group misses a part of the plurality of first vectors or the plurality of second vectors.

* * * * *